Patented June 17, 1952

2,600,446

UNITED STATES PATENT OFFICE 2,600,446

COPOLYMERS OF METHACRYLATES AND ALLYL ESTERS

William L. Van Horne and La Verne N. Bauer, Philadelphia, and Harry T. Neher, Bristol, Pa., assignors to Rohm & Haas Company, Philadelphia, Pa., a corporation of Delaware No Drawing. Application July 15, 1949, Serial No. 105,046

4 Claims. (Cl. 260—86.1)

This invention concerns copolymers from (A) esters of methacrylic acid and a saturated aliphatic monohydric alcohol of sixteen to twenty-four carbon atoms and (B) esters of a saturated aliphatic monocarboxylic acid of three to fourteen carbon atoms and an alcohol selected from the class consisting of allyl, methallyl, and 2-chloroallyl alcohols. It deals further with compositions of matter which are based on these copolymers dissolved in hydrocarbon liquids having waxy pour points. These compositions are characterized by pour points lower than those of the hydrocarbon fluids without said copolymers.

It has long been known that oils may be thickened by addition thereto of resinous materials. In some instances, the compositions resulting from solution of a polymeric product in an oil has an improved viscosity-temperature relationship. In some cases, the solution of polymeric material has a higher pour point than the oil itself. It other cases, the addition of polymer does not alter the pour point. In still other cases, the pour point is lowered. This effect is obtained primarily with hydrocarbon liquids containing wax. Polymers which are effective in such liquids can not, however, be predicated from the teaching of the art.

The influence of the copolymers of this invention on waxy hydrocarbon liquids could not have been foreseen from the behavior of individual polymers from the separate esters. Thus polymers of stearyl methacrylate, cetyl methacrylate, or octyl methacrylate, allyl octoate, allyl palmitate, allyl stearate, methallyl laurate, methallyl stearate, or 2-chloroallyl stearate fail to depress the pour point of waxy oils. Mixtures of these various polymers fail to have any economic value as pour point depressants, whereas the copolymers of this invention have a significant influence in depressing pour points of wax-containing liquids.

It is now found that oil-soluble copolymers from (A) methacrylic esters of long-chained saturated aliphatic monohydric alcohols and (B) allylic esters of saturated aliphatic fatty acids from propionic to myristic effect a considerable depression of normal pour points of wax-containing hydrocarbon fluids. For this specific combination of monomers yielding oil-soluble copolymers there is a greater latitude in the proportion of monomers which may be taken to yield copolymers which lower pour points than with effective combinations of other monomers yielding pour depressing copolymers. For each mole of a defined methacrylic ester there may be taken from 0.075 mole of an allyl ester up to a number of moles equal to twice the number of carbon atoms in the longest chain of the monocarboxylic acid forming the allyl ester. Thus, the number of moles of allyl ester which may be copolymerized with a methacrylic ester increases with the size of the allyl ester. While the above rule holds well up to about decanoic acid, it should be noted that somewhat larger proportions of allyl laurate or allyl myristate may be copolymerized to give effective copolymers.

The methacrylic esters which are taken to form the copolymers of this invention have the formula

$$CH_2=C(CH_3)COOR$$

where R is an alkyl group having a chain of sixteen to twenty-four carbon atoms. R may thus be a group such as cetyl, heptadecyl, stearyl, tricosyl, tetracosyl, or the like. The cetyl and stearyl esters are those of first choice. Methods of forming long-chained methacrylates are well known. While the alkyl group R may be obtained from pure alcohols, it is quite satisfactory to use commercial products which contain mixtures of such long groups.

The allyl esters are likewise obtainable according to known procedures. An allyl alcohol may be reacted with a carboxylic acid in the presence of an esterification catalyst. Water may be removed as by distillation of an azeotropic mixture containing a solvent, such as benzene, toluene, or naphtha. Acid anhydrides may be used in place of acids. Another method is based on reactions with acid halides.

The allyl, methallyl, and 2-chloroallyl groups all give similar end-copolymers and are, therefore, interchangeable in forming allyl esters. Other α-substituents than the methyl group or chlorine and substituents in the β-position fail to give copolymers having the required balance of properties in an economically desirable way.

Acid groups which yield allyl esters giving the kind of copolymers here desired are obtainable from saturated aliphatic monocarboxylic acids of three to fourteen carbon atoms. They include propionic, butyric, isobutyric, valeric, isovaleric, 2-methylbutanoic, pivalic, heptoic, caproic, isocaproic, 2-methylpentanoic, 3-methylpentanoic, 2,2-dimethylpentanoic, 3,5,5-trimethylhexoic, 2-ethylbutanoic, 2-ethylhexanoic, n-nonoic, isononoic, capric, undecanoic, lauric, myristic, and the like. While pure individual allyl esters may be used, there may also be used a mixture of these esters. The esters may be prepared, for instance, from a commercial mixture of lower fatty acids. The allowable proportions of mixtures are determined by the average chain length.

Copolymers from the methacrylic esters and the allylic esters are prepared by mixing the two kinds of esters in the presence of an inert organic solvent, such as benzene, toluene, xylene, or naphtha in an amount to ensure complete solution of copolymer, and copolymerizing therein by heating in the presence of a peroxidic catalyst. Copolymerization is effected in the temperature range of 70° C. to 160° C. An inert atmosphere should be used. This may be supplied by use of an inert gas, such as nitrogen, or by the vapors of a volatile inert organic solvent.

As catalysts there may be used one or more of such organic peroxides as acetyl peroxide, caproyl peroxide, lauroyl peroxide, benzoyl peroxide, dibenzoyl peroxide, di-tert.-butyl diperphthalate, tert.-butyl perbenzoate, 2,2-bis(tert.-butylperoxy)butane, methyl ethyl ketone peroxide, di-tert.-butyl peroxide, and tert.-butyl hydroperoxide. While about 2% of a peroxide in a mixture of monomers is sufficient to start copolymerization, it is desirable, if copolymerization is to be accomplished in a reasonable time, to use larger quantities. It is particularly effective to add small amounts of peroxide from time to time as copolymerization proceeds. Amounts of 3% to 15% or more of the total weight of monomers are useful.

Typical procedures for preparing the copolymers of this invention are presented in the following illustrative examples.

Example 1

A mixture was prepared from 70 parts of stearyl methacrylate, 144 parts of allyl laurate, 70 parts of toluene, and 17 parts of benzoyl peroxide. A portion of 48 parts of this mixture was placed in a reaction vessel and heated to 100° C. This mixture was stirred and blanketed with nitrogen. Small portions were added thereto at ten minute intervals, all of the mixture being introduced into the reaction vessel within two hours. Additions of 5 parts of benzoyl peroxide were made at 3 hours and 4.5 hours. At 6 hours, since the batch was becoming thick, 200 parts of toluene was added. At 6.33 hours 2 parts of benzoyl peroxide in 50 parts of toluene was added. At 6.33 hours 0.8 part of benzoyl peroxide was added. Stirring and heating were continued until eight hours had elapsed. The product was a 38.2% solution of copolymer in toluene. A portion of this was diluted to 30% of copolymer and found to have a viscosity of 142 cs. at 100° F.

Example 2

A mixture of 4 parts of tetracosyl methacrylate, 16 parts of allyl laurate, 5 parts of toluene, and one part of benzoyl peroxide was placed in a reaction vessel and stirred by passage of a stream of nitrogen gas therethrough. The vessel was heated to 113° C. for four hours, at 105° C. for 6.5 hours, and at 95° C. for 1.5 hours. At four hours 0.4 part of benzoyl peroxide was added, at 4.5 hours 1 part, at 5.5 hours 0.4 part, and at 6.5 hours 0.15 part. At 7.67 hours 17.4 parts of toluene was added. The product was a 47% solution of copolymer in a yield of 97.1%.

Example 3

A mixture was prepared from 45 parts by weight of cetyl methacrylate, 55 parts of methallyl laurate, 10 parts of toluene, and 5 parts of benzoyl peroxide. This was introduced during the course of two hours into a reaction vessel held at 110°–120° C. The mixture was stirred continuously and kept in this temperature range for three hours. It was then kept between 99° C. and 105° C. for the rest of the eight hour reaction time. Nitrogen gas was slowly passed through the apparatus to keep out air. Additions were made as follows:

At 3 hours, 2 parts of benzoyl peroxide in 15 parts of toluene;

At 5 hours, 5 parts of the peroxide in 20 parts of toluene;

At 6 hours, 2 parts of peroxide in 20 parts of toluene; and

At 7 hours, 0.8 parts of peroxide in 20 parts of toluene.

The product was a 38.6% solution of copolymer, corresponding to an 80% yield based on weight of monomers used. The viscosity of a 30% toluene solution was 3.9 cs. at 100° F.

The copolymer was transferred to a light petroleum oil by heating the toluene solution with the oil under reduced pressure. A 32.2% concentrate was thus prepared with final heating at 140° C. at one mm. This concentrate is suitable for addition to waxy oils to supply amounts from 0.05% to 5% of copolymer. This method of making an oil solution of a copolymer and use of these amounts of copolymer in waxy oils find general application for the copolymers here described.

Example 4

A mixture was prepared from 28.4 parts by weight of octadecyl methacrylate 171.6 parts of 2-chloroallyl laurate, 10 parts of toluene, and 10 parts of benzoyl peroxide. This mixture was gradually charged during two hours to a reaction vessel kept at 108°–115° C. The mixture was stirred and blanketed with nitrogen gas. Until the end of 4.25 hours the temperature was held at 110° C. It was then held at 100° C. for the rest of the heating period (7.75 hours). At the end of the first three hours 4 parts of benzoyl peroxide was added, at 4.5 hours 10 parts, at 5.5 hours 4 parts, and at 6.5 hours 1.6 parts. At 7.5 hours 190 parts of toluene was added. The product was a 40.3% solution of copolymer, corresponding to a yield of 82.4%. The viscosity of a 30% solution in toluene was 3.2 cs. at 100° F.

Example 5

A mixture of 7 parts of cetyl methacrylate, 3 parts of allyl butyrate, 10 parts of toluene, and 0.84 part of lauroyl peroxide was added to a reaction vessel during the course of 1.83 hours. The temperature of the copolymerizing mixture was kept at 100° C. and blanketed with nitrogen gas. Additions of benzoyl peroxide were made at 3, 4.5, 5.5, and 6.5 hours in amounts of 0.2, 0.5, 0.2, and 0.08 part respectively. Toluene was added at 7.5 hours in an amount of 9.0 parts. Total reaction time was eight hours. The product was a 33% solution of copolymer, which at 30% in toluene gave a viscosity of 5.2 cs. at 100° F.

Example 6

(a) A mixture of 97.5 parts by weight of octadecyl methacrylate, 2.5 parts of allyl propionate, 100 parts of toluene, and 5 parts of benzoyl peroxide was heated at 103°–105° C. for three hours and then at 109°–113° C. for five hours. During this period small amounts of benzoyl peroxide and toluene were added from time to time. The total amount of peroxide used was 14.8 parts. The product was a 41.6% solution of copolymer in an 85.6% yield.

(b) A mixture of 40 parts of octadecyl methacrylate, 60 parts of allyl propionate, 50 parts of toluene, and 5 parts of benzoyl peroxide was treated as in Example 6a. The product as obtained was a 53% solution of copolymer in toluene.

Both of the above copolymers depressed the pour points of waxy oils.

*Example 7*

A mixture of 40.5 parts of cetyl methacrylate, 59.5 parts of allyl propionate, 50 parts of toluene, and 4 parts of benzoyl peroxide was heated between 100° and 108° C. for eight hours as in previous examples. The peroxide and toluene added during the course of copolymerization amounted to 10 parts and 50 parts respectively. The product was a 38% solution of copolymer in 75% yield. This copolymer also had a significant effect on the pour point of wax-containing oils.

*Example 8*

A mixture of 53.3 parts of cetyl methacrylate, 46.7 parts of allyl isononoate, 50 parts of toluene, and 5 parts of azodiisobutyronitrile was heated between 120° and 100° C. during an eight hour period and peroxide and toluene added from time to time as in the previous examples. The copolymer obtained gave a viscosity of 7 cs. at 100° F. to a 30% solution in toluene. The ratio of methacrylic ester to allyl ester in this copolymer is 1:1.4.

*Example 9*

A mixture of 15 parts by weight of octadecyl methacrylate, 85 parts of allyl myristate, 50 parts of toluene and 7.5 parts of benzoyl peroxide was copolymerized during the course of 8.5 hours. Copolymerization was started with the temperature at 120° C. The temperature was allowed to fall during the copolymerization period to 103° C. Peroxide added from time to time amounted to 12.3 parts; toluene to 150 parts. The product was a 30% solution of copolymer in a yield of 88.6%. At 30% of the copolymer in toluene the solution had a viscosity of 3.8 cs. at 100° F.

The copolymers of this invention can be prepared with apparent molecular weights from about 1,000 to well over 50,000. The larger copolymers act not only as pour depressants but also as viscosity index improvers. For example, a copolymer from 85 parts by weight of octadecyl methacrylate and 15 parts of allyl laurate was carried to a size which gave a viscosity of 196 cs. at 100° F. to a 30% solution thereof in toluene. When this was dissolved in a 150 Pennsylvania neutral having a viscosity index of 106.9, it considerably increased this index. A 0.5% solution in this oil had a viscosity index of 115.9; a 2% solution gave a viscosity index of 132.1. The pour point of these solutions was reduced 30° F.

The influence of copolymers on the pour point of wax-containing hydrocarbon fluids was determined by introducing small amounts thereof into such fluids and observing the pour point of the solutions. Usually the A. S. T. M. pour test (D97-47) was applied. This was occasionally supplemented with maximum pour tests or with shock chilling. The maximum pour determination is described in Proc. A. S. T. M. 45, appendix I, p. 245 (1945). The shock chilling determination is made by observing the sample during the initial cooling step with the cooling jacket at −60° F.

Several types of oils were used for the tests. Oil I was a 150 Pennsylvania neutral having a pour point of +25° F. This was known to be an oil which was definitely amenable to the action of pour depressants. Oil II was an S. A. E. 90 gear oil compounded from 30 parts of a 180 Pennsylvania neutral and 70 parts of a 150 Pennsylvania bright stock. This oil has a pour point of +25° F. Oil III was a 500 Mid-Continent solvent-extracted oil (S. A. E. 30) with a pour point of +25° F. This was known to be an oil which was not readily changed in pour point.

A copolymer formed from cetyl methacrylate and allyl myristate in a mole ratio of 1:5.95 was dissolved in oil I at 0.5% and 0.25% to give a pour point in both cases of −10° F. At 0.04% in oil I the pour point was −5° F. In oil II at 0.1% the pour point was 5° F. In oil III at 0.5% the pour point was −15° F. by shock chilling.

A copolymer from stearyl methacrylate and allyl laurate in a 1:0.075 mole ratio gave pour points as follows:

In oil I at 0.5% 0° F., at 0.25% −5° F., at 0.1% 0° F.;
In oil II at 0.1% 10° F.;
In oil III at 0.5% 0° F.

A copolymer from stearyl methacrylate and allyl laurate in a 1:0.25 mole ratio gave pour points as follows:

In oil I at 0.5% and at 0.25% −15° F., at 0.1% −5° F.;
In oil II at 0.1% 5° F.;
In oil III at 0.5% −5° F. by shock chilling.

A copolymer from stearyl methacrylate and allyl laurate in a 1:7.5 mole ratio had the following effects on pour points of the test oils:

In oil I at 0.5% and 0.25% −20° F., at 0.04% −5° F.;
In oil III at 0.5% −20° F. by shock chilling and −5° F. by the maximum pour test.

A copolymer from stearyl methacrylate and allyl laurate in a 1:24 mole ratio gave pour points of −25° F. in oil I at 0.5% and 0.25% but was not effective below the latter concentration—indicating that the upper limit for the proportion of allyl laurate had been reached.

A copolymer from stearyl methacrylate and 2-chloroallyl laurate in a mole ratio of 1:7.5 was tested. In oil I at 0.5% it gave a pour point of −10° F. and in oil III at 0.5% it gave a pour point of −10° F. with shock chilling.

A copolymer of tetracosyl methacrylate and allyl laurate in a 1:7 mole ratio was examined in the test oils. In oil I at 0.5% it reduced the pour point to −15° F. and in oil III at 0.5% to −5° F.

Copolymers were prepared from octadecyl methacrylate and allyl propionate over a range of ratios of the two esters. The copolymer based on a mole ratio of 1:0.075 gave pour points of 0° F. at 0.5% in oil I or oil III. The copolymer with a mole ratio of 1:0.25 gave pour points of −10° F. at 0.5% and 0° F. at 0.25% and 0.1% in oil I and of 10° F. in oil II at 0.1%. A copolymer with a mole ratio of 1:2.9 gave pour points of 0° F. in oil I at 0.5% and 0.25%. A copolymer with a mole ratio of 1:4.5 gave a pour point of —5° F. at 0.5% in oil I and of 5° F. at 0.5% in oil III.

A copolymer from octadecyl methacrylate and allyl isononoate in a 1:1.5 ratio gave a pour point of —25° F. at 0.1% in oil I and of —10° F. at 0.5% in oil III. A solution of the polymer from octadecyl methacrylate in oil I at 0.5% increased the pour point slightly. A polymer from allyl isononoate at 0.5% in oil I did not change the pour point. A mechanical mixture of the two separately formed polymers in a ratio of 1:1.5 failed to alter the pour point when dissolved in oil I at 0.1% or in oil III at 0.5%.

A copolymer from cetyl methacrylate and allyl 3,5,5-trimethylhexoate in a mole ratio of 1:1.04 gave a pour point at 0.5% in oil I of —25° F. and at 0.1% in oil I of —20° F. In oil II at 0.1% this copolymer depressed the pour point to 0° F. In oil III at 0.5% it gave a pour point of —20° F. by shock chilling.

A copolymer from the above monomers in a mole ratio of 1:1.98 gave a pour point of —20° F. at both 0.5% and 0.25% in oil I.

Two copolymers were prepared from cetyl methacrylate and methallyl laurate. One had a ratio of 1:1.49 for the two components and was carried to a degree of copolymerization such that a 30% solution in toluene had a viscosity of 3.9 cs. at 100° F. The other had a ratio of 1:3.66 for the two components. It gave a viscosity in a 30% toluene solution of 2.7 cs. at 100° F. Each copolymer at 0.5% in oil I depressed the pour point to —20° F. and in oil III at 0.5% gave a pour point of —5° F. by shock chilling and +5° F. by maximum pour test.

A copolymer from octadecyl methacrylate and allyl myristate in a 1:4 ratio gave pour points of —15° F. at 0.5% and 0.25% in oil I.

The copolymers here described are novel and possess an unexpected utility. They are soluble in hydrocarbon liquids and depress the pour point of wax-containing liquids. They are particularly useful in petroleum products from paraffinic and naphthenic stocks. The presence of 0.05% to 5% of one or more of the copolymers dissolved in a wax-bearing hydrocarbon liquid effectively depresses the normal pour point of such liquid. This effect is obtained with a wide range of apparent molecular sizes of the copolymers and is of value not only in lubricating oils but also in such liquids as fuel oils and diesel fuels having a waxy pour point. The copolymers of relatively large molecular sizes are also effective in increasing the viscosity index of oils. The presence of the copolymers does not interfere with the normal functioning of the oils or fuels. They are compatible with other additives, such as antioxidants, wear-resisting agents, oiliness agents, extreme pressure agents, detergents, and the like.

We claim:

1. An oil-soluble copolymer from (A) an ester of methacrylic acid and a saturated aliphatic monohydric alcohol having an alkyl group with a straight chain of sixteen to twenty-four carbon atoms and (B) an allylic ester of an alkanoic acid of three to fourteen carbon atoms and an alcohol selected from the class consisting of allyl, methallyl, and 2-chloroallyl alcohols, the ratio of groups from the methacrylic ester to the allylic ester being from 1:0.075 to 1 to a number equal to twice the number of carbon atoms in the longest chain of the allylic ester.

2. An oil-soluble copolymer of octadecyl methacrylate and allyl laurate, the mole ratio of methacrylate groups therein to the laurate groups being 1:0.075 to 1:24.

3. An oil-soluble copolymer of octadecyl methacrylate and allyl 3,5,5-trimethylhexoate, the mole ratio of methacrylate groups therein to the 3,5,5-trimethylhexoate groups being 1:0.075 to 1:12.

4. An oil-soluble copolymer of cetyl methacrylate and allyl 3,5,5-trimethylhexoate, the mole ratio of methacrylate groups therein to the 3,5,5-trimethylhexoate groups being from 1:0.075 to 1:12.

WILLIAM L. VAN HORNE.
LA VERNE N. BAUER.
HARRY T. NEHER.

REFERENCES CITED

The following references are of record in the file of this patent:

UNITED STATES PATENTS

| Number | Name | Date |
|---|---|---|
| 2,125,885 | Bruson | Aug. 9, 1938 |
| 2,129,664 | Barrett | Sept. 13, 1938 |
| 2,234,829 | Neher | Mar. 11, 1941 |
| 2,407,954 | Fenske et al. | Sept. 17, 1946 |
| 2,419,221 | Kenyon | Apr. 22, 1947 |
| 2,440,318 | White | Apr. 27, 1948 |
| 2,441,023 | Larsen | May 4, 1948 |
| 2,524,563 | Evans et al. | Oct. 3, 1950 |

OTHER REFERENCES

"Allyl Alcohol" by Shell Devel. 1946, pages 27 to 31 pertinent.